US011706248B2

(12) United States Patent
Arora et al.

(10) Patent No.: US 11,706,248 B2
(45) Date of Patent: Jul. 18, 2023

(54) AGGREGATION AND FLOW PROPAGATION OF ELEMENTS OF CYBER-RISK IN AN ENTERPRISE

(71) Applicant: Fidelis Cybersecurity, Inc., Bethesda, MD (US)

(72) Inventors: Anubhav Arora, Bethesda, MD (US); Abhishek Sharma, Washington, DC (US); Rami Mizrahi, Bethesda, MD (US); Gerald Mancini, Bethesda, MD (US); Abdul Rahman, Accokeek, MD (US)

(73) Assignee: Fidelis Cybersecurity, Inc., Bethesda, MD (US)

( * ) Notice: Subject to any disclaimer, the term of this patent is extended or adjusted under 35 U.S.C. 154(b) by 24 days.

(21) Appl. No.: 17/163,745

(22) Filed: Feb. 1, 2021

(65) Prior Publication Data
US 2021/0243223 A1 Aug. 5, 2021

Related U.S. Application Data

(60) Provisional application No. 62/968,374, filed on Jan. 31, 2020.

(51) Int. Cl.
*H04L 9/40* (2022.01)

(52) U.S. Cl.
CPC .............. *H04L 63/1441* (2013.01)

(58) Field of Classification Search
CPC ............ H04L 63/1491; H04L 63/1433; H04L 63/1441; H04L 41/145; H04L 41/147; G06F 21/577
See application file for complete search history.

(56) References Cited

U.S. PATENT DOCUMENTS

| | | | |
|---|---|---|---|
| 2012/0072983 A1 | 3/2012 | Mccusker et al. | |
| 2012/0143650 A1* | 6/2012 | Crowley | G06Q 10/0635 726/25 |
| 2013/0247205 A1* | 9/2013 | Schrecker | G06F 21/577 726/25 |
| 2014/0351940 A1* | 11/2014 | Loder | H04L 41/0856 726/25 |
| 2016/0173521 A1 | 6/2016 | Yampolskiy et al. | |
| 2016/0226905 A1 | 8/2016 | Baikalov et al. | |
| 2016/0248797 A1 | 8/2016 | Yampolskiy et al. | |
| 2019/0327260 A1* | 10/2019 | Adamson | H04L 63/1433 |
| 2020/0252422 A1* | 8/2020 | Davis | H04L 63/102 |

* cited by examiner

*Primary Examiner* — Ali S Abyaneh
(74) *Attorney, Agent, or Firm* — McDermott Will & Emery LLP

(57) ABSTRACT

A computer-implemented method for computing or modeling the risk of a cyber security breach to an asset begins by gathering coverage information from network sensors, endpoint agents, and decoys related to the asset, as well as gathering importance information related to the asset, alerts and anomalies from an enterprise and vulnerability information related to the asset. From this, a threat-score is computed for the asset. Connections or coupling information is gathered between users and assets, users and data, and assets and data, which is fused to generate a 3-dimensional vector representation of coverage, importance, and threat-score of the assets, users and data. From this 3-dimensional vector, an asset risk score is computed to provide the asset risk score.

1 Claim, 4 Drawing Sheets

AGGREGATION AND FLOW PROPAGATION OF ELEMENTS OF CYBER-RISK IN AN ENTERPRISE

RELATED APPLICATIONS

This application claims the benefit of U.S. Provisional Application No. 62/968,374 filed Jan. 31, 2020.

TECHNICAL FIELD

The technical field relates generally to protection against cyber-attacks in an enterprise computing system, and more particularly to an improvement in cybersecurity by aggregation and flow propagation analysis of element of cyber-risk in an enterprise.

BACKGROUND

Risk of a cyber-attack or a breach is a real and present danger in all enterprises today. As used herein an "enterprise" means the communication or information processing architecture of a home, business, government agency, etc. The internet of today offers myriad ways of reconnaissance, preparation, all phases of 'attack kill chain' used to breach an enterprise, and then allow for the attacker to profit in some way and conceal the tracks and evidence. This is true for an external attacker with no connections and direct access to an enterprise, and for an internal (insider) breach scenario. To safeguard against these attacks, enterprises utilize many different products and technologies to protect their people, data and assets, and to respond effectively in case an incident were to occur. In any enterprise, a measurement of the risk, and an understanding of the avenues that increase risk is critical for the process of security, that needs to continuously assess, monitor, adapt, and control the risk.

Accordingly, there is a need for continuous improvement in the field of cybersecurity and techniques to prevent, reduce or confine cyber-attacks. Furthermore, other desirable features and characteristics of the present invention will become apparent from the subsequent detailed description and the appended claims, taken in conjunction with the accompanying drawings and the foregoing technical field and background.

SUMMARY

The present disclosure identifies elements of cyber-risk, and their aggregation & flow propagation across an enterprise in order to create a multi-dimensional metric of risk that can be the basis of a risk measurement in an enterprise to facilitate the security operations and processes. According to fundamental embodiments, the present disclosure incorporates risk measurement in the threat detection and response process and uses automated risk quantification as a key element in the prioritization and resolution of cybersecurity incidents.

In accordance with a non-limiting embodiment, a computer-implemented method for computing or modeling the risk of a cyber security breach to an asset begins by gathering coverage information from network sensors, endpoint agents, and decoys related to the asset, as well as gathering importance information related to the asset, alerts and anomalies from an enterprise and vulnerability information related to the asset. From this, a threat-score is computed for the asset. Connections or coupling information is gathered between users and assets, users and data, and assets and data, which is fused to generate a 3-dimensional vector representation of coverage, importance, and threat-score of the assets, users and data. From this 3-dimensional vector an asset risk score is computed to provide the asset risk score.

DESCRIPTION OF THE DRAWINGS

The present invention will hereinafter be described in conjunction with the following drawing figures, wherein like numerals denote like elements.

DETAILED DESCRIPTION

Figure 1:
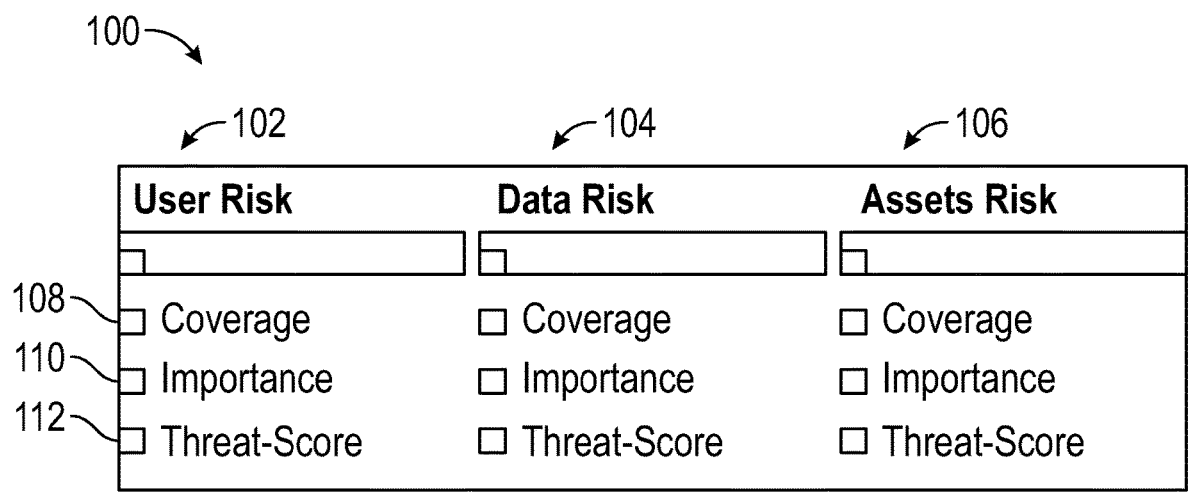
FIG. 1 is an illustration representing the three cyber-risk elements (i.e., Assets, Users and Data) represented as vectors in the three same dimensions of Coverage, Importance and Threat-Score that characterizes Asset-based risk in accordance with exemplary embodiments.

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Some of the embodiments and implementations are described above in terms of functional and/or logical block components and various processing steps. However, it should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Finally, for the sake of brevity, conventional techniques and components related to cybersecurity and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-4 are merely illustrative and may not be drawn to scale.

In accordance with fundamental embodiments, the elements of cyber-risk identified are based on the objective of a security operation and process to protect the people, data and assets of an enterprise. The security operations process includes: (i) Coverage of securing the enterprise by deploying endpoint & network security products for various functions (e.g., protection from advanced threats, malware protection, vulnerability scanning/patching, data loss protection, firewalls, cloud access, decoys); (ii) Cyber-hygiene to configure and deploy information technology (IT) assets in a secure manner (e.g., secure IP management and DNS services, network access control and segmentation of network resources, trusted software deployment and configuration management of assets, digital rights management for data, Identity & Access Management to provide and restrict access to data, encryption services, MFA); (iii) Intelligent deception & decoys adaptive to the environment and spreading "breadcrumbs" to create a layer of defense in case all protection and detection measures were to fail; (iv) Processes, monitoring and digital forensics useful for an incident response process that might require in-depth investigation of users, endpoint, and network to assess the depth, scale and impact of an investigation; (v) Understanding 'Importance' of Users from the perspective of their role in the organization, the data and assets they have access to, their regular (and irregular) collaborators, alternate digital identities used for access outside and within the enterprise; and (vi) Data: the data in an organization has different types of importance—it could be company confidential intellectual property (e.g., source code, designs, blueprints) or customer (e.g., invoices, inventory, leads) or operational data (e.g., financial, IT, payroll), or it could be sensitive data about the people in the company or the customers (e.g., PII or PHI data).

According to the present disclosure, this content and hence importance of data can be discovered with automated algorithms to scan, discover and analyze data with Machine Learning (ML) algorithms to cluster it in different types, including the following terms and phrases, which as used herein, have the meaning defined as follows:

"Alerts and Anomalies": alarms, flags or other warning providing indications of an on-going cybersecurity attack or breach, monitoring unusual events or trends in data activity, file access attempts or other enterprise activity.

"Assets" including the connectivity of the asset and its access to network resources, services offered by the asset like file sharing, software on the server assets and its importance towards mission critical (like license key generation, operational data generation/distribution).

"Threat-Score" meaning a score that summarizes information from observed threat activity (e.g., alerts from security incidents), suspicious user/asset behavior, and unpatched vulnerabilities.

"User" means a measure whether the user is under attack by some means including phishing, spear-phishing, stolen credentials, and if a user behavior pattern that involved access to network (e.g., files, VPN) and asset resources (e.g., login/logout, length of sessions) can be classified into activity resembling impersonation or insider threat.

"Coverage" means the coverage of securing the enterprise gathered by deploying endpoint agents & network sensors and other known security products for various functions (e.g., protection from advanced threats, malware protection, vulnerability scanning/patching, data loss protection, firewalls, cloud access, decoys). This includes:

Deploying endpoint agents & network scanners and other known security products for various functions (protection from advanced threats, malware protection, data loss protection, firewalls, cloud access, decoys etc.).

Cyber-hygiene: to configure and deploy IT assets in a secure manner (secure IP management and DNS services, network access control and segmentation of network resources, trusted software deployment and configuration management of assets, digital rights management for data, Identity & Access Management to provide and restrict access to data, encryption services, MFA etc.).

Intelligent deception and decoys: a cybersecurity deception defense that lure attackers to interact with one or more decoys thereby triggering an alert. These alerts have a very high probability of coinciding to an ongoing attack. As a non-limiting example, Fidelis Deception™ technology uses accurate enterprise information to auto-generate decoys for deception layers. Decoys have profiles, services and regular activity matching the environment, plus recommended breadcrumbs for placement on nearby real assets to act as lures to decoys. Decoys are often adaptive to the environment and create a layer defense in case other protection and detection measures were to fail or be circumvented.

Processes, monitoring, and digital forensics: useful for an incident response process that might require in-depth investigation of users, endpoint, and network to assess the depth, scale, and impact of an investigation.

Deploying Vulnerability Scanners that can scan assets & services for known CVEs and Automated patching solutions for operating systems and software in use increases the Coverage of assets.

"Importance" means a measure of the importance of the user from the perspective of their role in the organization, the data and assets they have access to, their regular (and irregular) collaborators, and alternate digital identities used for access outside and within the enterprise. According to the present disclosure, the importance measure may be gathered by input from cybersecurity administrators and/or automated scan. The Importance measure includes:

Users: from the perspective of their role in the organization, the data and assets they have access to, their regular (and irregular) collaborators, and alternate digital identities used for access outside and within the enterprise Data: the data in an organization has diverse types of importance—it could be company confidential intellectual property (source code, designs, blueprints), customer information, (invoices, inventory, leads), operational data (financial, IT, payroll), sensitive data about the people in the company or customers (PII or PHI data for example), etc. This content and hence importance of data can be discovered with automated algorithms to scan, discover, and analyze data with ML algorithms to cluster it based on data type Assets: connectivity of the asset and its access to network resources, services offered by the asset like file sharing, software on the server assets and its importance towards mission critical services (like license key generation, operational data generation/distribution). Additionally, mission critical assets can be given a higher importance if they are a single point of failure. This is especially important if the asset becomes a single point of failure due to its relationship to and/or dependency of other assets.

"Data" means a measure of the specific threats on that class of data by using detection of such data in cases of past breaches. In some embodiments, it may include knowledge of such existing or known compromises as well as in a "dark-net". Data may include different classes of data as laid out above in Importance.

"Asset" means a measure of the threats that have been detected on the asset using endpoint and network security software, like malware, command and control, etc., and any remediation that has been initiated including its consequences and conclusions.

"Vulnerabilities" means identification gathered of known vulnerable software and firmware installed across the enterprise, which can raise the risk of exploits as long as the software has not been patched or uninstalled.

In accordance with fundamental embodiments, the present disclosure operates to incorporate risk measurement in the threat detection and response process, and to use automated risk quantification as a key element in the prioritization and resolution of incidents.

Risk Aggregation.

Referring to FIG. 1, a multi-dimensional characterization 100 of enterprise risk is illustrated. In fundamental embodiments, risk is aggregated across entities with similar profiles to depict the risk of a group and computing the flow propagation of risk from one aggregate group to another as an efficient approach for computing enterprise risk for actual or live events. This measurement can be used for prioritizing, facilitating and automating the security operations and processes for detection and response. As illustrated in FIG. 1, the present disclosure employs three elements of cyber-risk based and are depicted based on the objectives of security operations to protect the people (users) 102, data 104, and assets 106 of an enterprise. Effective security operations require maintaining defensive Coverage 108 by deploying various cybersecurity tools and processes, understanding the Importance 110 of each asset owned by an enterprise, and effective response to alerts and suspicious events (anomalies) identified by threat detection products by scoring alerts and events (i.e., computing a Threat-Score 112 as discussed below).

Coverage 108 captures and gathers all the activities involved in securing the enterprise, including but not limited to: (i) deploying endpoint & network security products for various functions (protection from advanced threats, malware protection, data loss protection, firewalls, cloud access, decoys etc.); (ii) cyber-hygiene: to configure and deploy Information Technology (IT) assets in a secure manner (secure IP management and DNS services, network access control and segmentation of network resources, trusted software deployment and configuration management of assets, digital rights management for data, identity & access management to provide and restrict access to data, encryption services, MFA etc.); (iii) intelligent deception and decoys: adaptive to the environment and spreading breadcrumbs to create a layer defense in case all protection and detection measures were to fail; (iv) Processes, monitoring, and digital forensics: required for an incident response process that might require in-depth investigation of users, endpoint, and network to assess the depth, scale, and impact of an investigation; (iv) deploying vulnerability scanners that can scan assets & services for known CVEs and automated patching; and (v) deploying vulnerability scanners that can scan assets & services for known CVEs and automated patching solutions for operating systems and software in use increases the Coverage 108 of assets.

Cyber-risk is also a form of operational risk to enterprises and to understand how investment in improving Coverage 108 leads to reduction in cyber-risk assets with elevated risk need to be identified. This knowledge and the processes involved in acquiring and keep it up to date is referred to herein as the Importance 110 element of cyber-risk. To understand the importance of Importance 110 the present disclosures analyzes: (i) Users 102 from the perspective of their role in the organization, the data and assets they have access to, their regular (and irregular) collaborators, and alternate digital identities used for access outside and within the enterprise; (ii) Data 104 in that the data in an organization has diverse types of importance. As a non-limiting example, it could be company confidential intellectual property (source code, designs, blueprints), customer information, (invoices, inventory, leads), operational data (financial, IT, payroll), sensitive data about the people in the company or customers (PII or PHI data for example), etc. This content and hence importance of data can be discovered with automated algorithms to scan, discover, and analyze data with ML algorithms to cluster it based on data type; and (iii) Assets 106, including the connectivity of the asset and its access to network resources, services offered by the asset like file sharing, software on the server assets and its importance towards mission critical services (like license key generation, operational data generation/distribution). Additionally, mission critical assets can be given a higher importance if they are a single point of failure.

As will be appreciated by those skilled in the art, cyber threats to an enterprise can be observed in three forms—(1) alerts from security incidents, (2) suspicious or anomalous behaviors by users and assets, and (3) unpatched vulnerabilities that increase the attack surface. Typically, enterprises use one or more cybersecurity solutions that apply signatures and rules for known threats to observed network traffic and endpoint activity and generate alerts whenever a match occurs. Each of these alerts can be considered as an indicator of risk (malicious, suspicious, or potentially insider threat activity) with varying degree of confidence based on the source and reliability of the detected activity. User and Entity Behavior Analytics (UEBA) including Machine Learning based Anomaly Detection are the de-facto signatureless solution for detecting suspicious behavior. The Anomaly models are based on tradecraft knowledge of threat behavior being different in certain aspects, and the degree of non-conformance as well as the number of such findings increases the confidence in the finding(s). Enterprises commonly detect unpatched vulnerabilities by scanning assets for installed software and firmware with known vulnerabilities that can be exploited by adversaries. The standard industry term of this is Common Vulnerabilities and Exposures (CVE). We refer to CVEs as static or likely (in future) component of Cyber-risk in the sense that it may result in a security incident in future. The fact that cyber-risk of CVE can change over time often does not significantly change the risk for a particular enterprise. There is however a subset of unpatched vulnerabilities with known or attempted exploits on software that is in active use & configured in a way that the vulnerability can be exploited. The present disclosure gives additional consideration to this subset of vulnerability detections and is tracked as part of the vector in Threat-Score 112. According to the present disclosure, Threat-Score 112 computation is based on current events reflected by events, alerts, anomalies and exploitable unpatched CVE findings. Since the exploitable unpatched CVE component represents a risk of future attack versus alerts and anomalies components representing the risk of active attack, the components are tracked separately as a vector.

Figure 2:
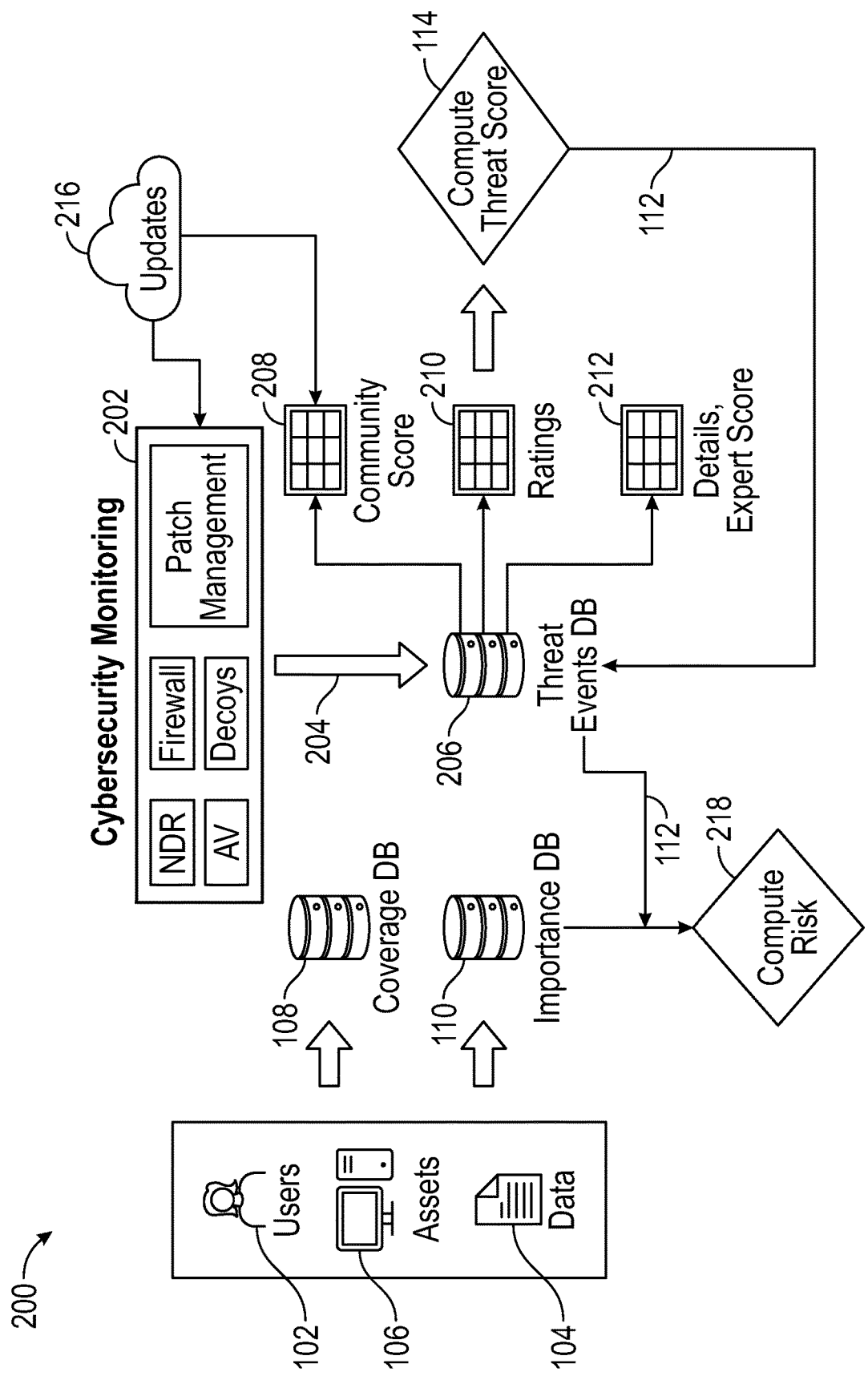
FIG. 2 is a block diagram of a cybersecurity system in accordance with exemplary embodiments.
Figure 3:
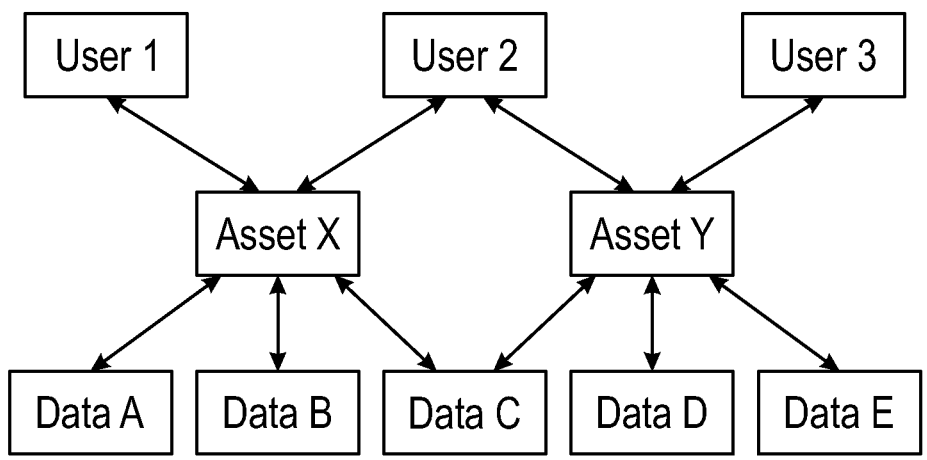
FIG. 3 is an illustration of the information-fusion step utilizing relationships between Assets and Users, Assets and Data, and Users and Data in accordance with exemplary embodiments.

Referring now to FIG. 2, a block diagram 200 is shown illustrating the components and data flows according to the present disclosure. As discussed above in connection with FIG. 1, users 102, data 104 and assets 106 are analyzed and coverage 108 and importance 110 parameters are gathered to be used to compute enterprise risk. Cybersecurity monitoring 202 provides detection of threats 204 to a threats event database 206. From the threats event database, a community score 208, a feedback score 210 and an expert score 112 are generated.

The community score 208 is generated by a detection approach (e.g., rule, signature, and ML algorithm) that is deployed across a diverse enterprise base and system analysts rate the alerts to provide community or crowdsourced component to Threat-Score 112. In some embodiments, this involves collecting telemetry on the rated alerts and using it to infer the prevalence of different types of threat activity across a diverse customer base and whether multiple customers are rating certain types of alerts or events as Actionable/Interesting vs. False Positive/Not-Interesting.

The analysts' feedback score 210 is complied by the inputs of system analysts during the process of triaging and investigating alerts. That is, analysts determine whether an alert or event detects a threat or suspicious activity or a false positive. According to some embodiments, analyst provides a rating for an alert. As will be appreciated, such a rating system can be viewed analogous to viewers rating movies on streaming video service, items bought on a website market, or restaurants reviews on a social media page. According to the present disclosure, similar feedback mechanisms can be constructed to capture analyst's knowledge and intuition via ratings and use the ratings to provide the analyst's feedback score 110.

According to the present disclosure, the expert score 112 is a numeric score mapped from various rules or signatures written by an analyst or a detection algorithm (analytics or Machine Learning based). It is typical for a detection component to also assign a severity or priority to events (e.g., cybersecurity severity levels: Low, Medium, High, and Critical) to help analysts prioritize their work.

The threat score 112 is computed (e.g., generated or mapped) 214 from the three components: the community score 208, the feedback score 210 and the expert score 112 score. The Threat-Score for an alert, anomaly or event comprises a weighted combination of expert, analyst rating or feedback, and community scores. These three scores capture the expertise of three different stakeholders in Cybersecurity: the malware/threat researchers, the analysts at an enterprise, and the customer base of the particular product.

Those skilled in the art will appreciate that any cybersecurity system requires constant updates to address the ever evolving cyberthreats forced upon an enterprise. Accordingly, the cybersecurity monitoring equipment and the parameters used to provide the community score 208, the feedback score 210 and the expert score 112 score are updated from time to time by a cloud-based system 216.

In summary, a computer-implemented method for computing or modeling the risk of a cyber security breach to an asset begins by gathering coverage information from network sensors, endpoint agents, and decoys related to the asset, as well as gathering importance information related to the asset, alerts and anomalies from an enterprise and vulnerability information related to the asset. From this, a threat-score is computed for the asset. Connections or coupling information is gathered between users and assets, users and data, and assets and data, which is fused to generate a 3-dimensional vector representation of coverage 108, importance 110, and threat-score 112 of the assets 102, users 104 and data 106 (see FIG. 1 and associated text). From this 3-dimensional vector an asset risk score is computed to provide the asset risk score.

As discussed above, according to the present disclosure, the coverage 108, importance 110 and threat score 112 are used to compute and provide 218 the cyber risk of an entity. According to the present disclosure, a normalization process transforms the user risk 102 and data risks 104 into asset-level risks 108. As discussed above, for both user risk 102 and data risk 104 there are the same three cyber-risk elements, namely, Coverage 108, Importance 110, and Threat-Score 112. The normalization process involves an information-fusion step that transforms the individual vectors from each dimension into a risk representation per asset vector (i.e., coverage 110, importance 110, and Threat-Score 112). The information fusion step uses relationships between assets and users (access, history of usage), assets and data (data at rest, data in motion), and users and data (access rights, data observed in Email or other ways of access and usage). A non-limiting example of these relationships are shown represented as a graph in FIG. 3

According to the present disclosure, any particular fusion algorithm may be selected by the system administrator, however, in a first non-limiting example, the present disclosure contemplates that the information fusion take advantage of the configuration of a contemporary enterprise that provides a wide variety of assets (e.g., workstations, laptops, on-premise or cloud-based servers) to access computing resources and for reading, writing, updating, and deleting data. Accordingly, there is a one-to-many relationship between a user and assets, and between a user and data. such relationships can be characterized by a graph similar to FIG. 3 with mappings between users and data to assets. Thus, the graph of FIG. 3 can illustrate the propagation of the Coverage 108, Importance 110, and Threat-Score 112 from users 102 and data 104 to assets 106. Coverage 110 for a user 103 can be improved by enabling two-factor authentication, and DRM (Digital Rights Management) improves the Coverage 110 for data 104. Thus, the coverage level can be propagated from users and data to assets that are directly connected to them in the graph in FIG. 3. In a second non-limiting example, the information fusion may be accomplished via embedding. In this example, the information fusion step approximates learning a lower dimensional representation of the three-dimensional view (Coverage 108, Importance 110, and Threat-Score 112) of the cyber risk for assets 106, users 102, and data 104. Deep Learning and nonlinear dimensionality reduction techniques can be used to encode interaction structures in the assets-users-data relationship graph into low-dimensional embeddings.

As discussed above, a multi-element representation of cyber-risk (e.g., Assets, Users and Data) is created via the present disclosure utilizing a normalization process that transforms the Users and Data risk (i.e., enterprise risk) into Asset-level risks. This offers an advantage in leveraging Asset-level risk as the focal point of analysis and to utilize novel solutions for understanding the enterprise-wide risk. The normalization process consists of two key components: (i) representing all three cyber-risk elements (i.e., Assets 108, Users 102 and Data 104) as vectors in the three same dimensions of Coverage 108, Importance 110 and Threat-Score 112 that characterizes Asset-based risk; and (ii) an information-fusion step that transforms the individual vectors from each dimension into a risk representation per asset (i.e., Coverage 108, Importance 110 and Threat-Score 112 per asset). The information-fusion step uses relationships between Assets & Users (e.g., access, history of usage), Assets and Data (e.g., data at rest, data in motion), and Users and Data (e.g., access rights, data observed like in Email) represented in a Graph (see, FIG. 3).

Additionally, the information-fusion does not assume any particular algorithm. Instead, conventional algorithms known in the art may be used as selected by cybersecurity designers based upon implementation. This approach facilitates lower dimensional representations of multi-element representations of risk through simple transformations of vectors, for example, into matrices using "Deep Learning" to learn embeddings as understood by those skilled in the art. The normalization process discussed above utilizes this transformation process based upon the insight that a modern enterprise provides Users with a wide variety of Assets (e.g., workstations, laptops, on-premise or cloud-based servers) to access computing resources and for reading, writing, updating, and deleting data. This normalization process and its relationships can also be characterized a graph with mappings between Users and Data to Assets. These mappings can be expressed by the present disclosure in this manner because Users and Data have the same three dimensions of Coverage, Importance and Threat-Score as the ones used to represent the risk-related information for an Asset. For example, Anti-Virus software can impact the Coverage score for Assets (it increases the coverage score), and analogously, two-factor authentication and DRM (Digital Rights Management) can impact the Coverage score for Users and Data, respectively.

Figure 4:
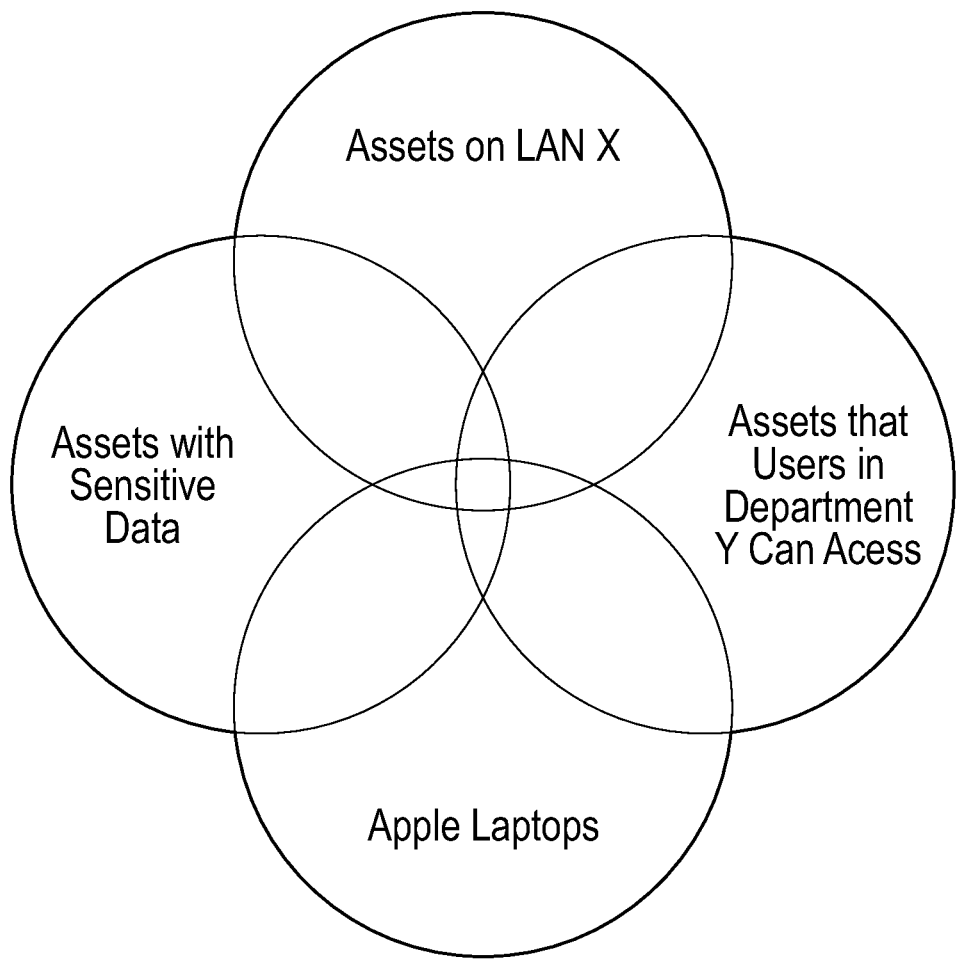
FIG. 4 is an illustration of individual clusters combined into larger clusters in accordance with exemplary embodiments.

Operationally, the mapping and process described above allows embodiments of the present disclosure to aggregate Assets into groups with a similar profile: An IT-centric view can be used to organize assets into different types (e.g., based on operating systems, hardware vs virtual vs cloud, computers vs IOT etc.), roles (e.g., client workstations, laptops, servers, services like printers, storage etc., networking equipment, security equipment), and access controlled units (e.g., network access based on segmentation control, and IP & DNS management using Active Directory like services, user access based on IAM controls). The advantage behind utilizing this grouping is that Assets with similar profiles (i.e., commonalities in terms of type, role, and administrative units) should exhibit similar behavior. These units can be further refined using understanding of data that resides on the Assets and the Users that access these Assets. Conventional "Machine Learning" algorithms can also be used to group Assets into clusters as illustrated in FIG. 4.

Machine Learning algorithms such as K-Means or Hierarchical Clustering can be used to group assets into clusters. Such an approach can combine an IT-centric profile of an asset, i.e., its type, role or services view, with its behavioral profile (i.e., the observed network activity, users' access patterns, for example, work hours vs. off-hours or weekdays vs. weekends, etc. Furthermore, an asset can have hard (each asset belongs to only one cluster) or soft (each asset has a score for each cluster that indicates the strength of similarity of the asset to the cluster) associations as well as flat vs. hierarchical (individual clusters are combined large clusters and represented as a tree) groupings can be seen in the FIG. 4 example of grouping of assets in different organized groups. The risk associated with the asset group should be tracked similar to asset risk as a vector of (Coverage, Importance, Threat-Score) and are aggregated on the principles of: (i) the Threat-Score 112 should be aggregated primarily based on the maximum score in the group and the number of assets in the top quantile; (ii) the unpatched exploitable CVE component of Threat-Score should be aggregated based on all CVEs found in the assets of the group, as if they were to be found on a single asset; (iii) the Security tool Coverage of the group should be based on the 'common denominator' coverage & protection that are deployed uniformly for all assets in that group; and (iv) the Importance of the group should be based on the highest Importance of any asset in the group, and also the number of assets in top quantile.

From a Detection and Response perspective of estimating risk based on current events, aggregating assets into groups enables two types of risk analysis. First, an analysis of the asset risk profiles against one another within the same group. This enables 'apple to apples' comparisons of asset risk. As a non-limiting example, such comparisons can be used to—(a) detect outliers within a group, and (b) estimate the prevalence of threat events across a group. Accordingly, prevalence of threat events within a group can be valuable signal for enterprise-level risk assessment and planning an appropriate response. Second, an analysis of enterprise level risk can be made from different vantage points based on different groupings of assets. For example, to compare and contrast the risk profile of assets, services, and data accessed by users from different departments, assets with different communication patterns like internal only vs. accessing websites and services outside the corporate network.

Propagation of Risk.

In FIGS. 1-4, enterprise risk was determined and aggregated into clusters of assets. From there, the present disclosure contemplates determining the propagation of risk across assets groups, and thus, an enterprise. In fundamental embodiments, flow propagation of elements of risk are determined by analyzing network pathways for effective response. In some embodiments, there are two types of pathways: (i) from the perimeter to the core of an enterprise network; and (ii) within in an enterprise network. Additionally, there are three types of capabilities typically possessed by adversaries: (i) scanning to get open ports and services in the network; (ii) attempt to exploit unpatched vulnerabilities in applications; and (iii) use of stolen credentials or phishing. Together, these two pathways and three capabilities create a matrix that covers several stages of an attack kill-chain, (e.g., Reconnaissance, Initial Access, Persistence, Credential Access, Discovery, and Lateral Movement in the MITRE ATT&CK framework).

Figure 5:
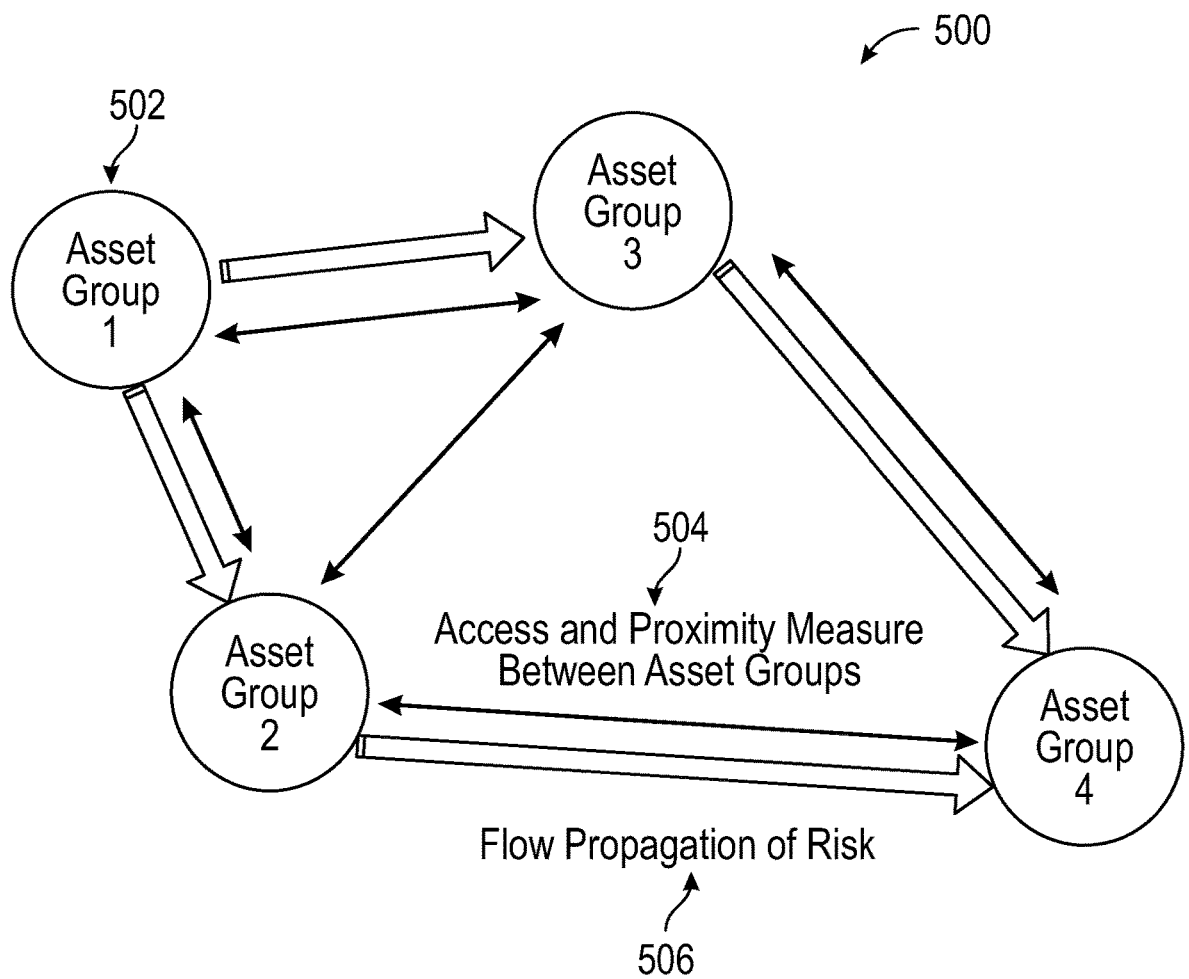
FIG. 5 is an illustration of flow propagation of elements of cybersecurity risk in network pathways and access to internal and external resources to create measures of flow (i.e., the likelihoods of risk in one cluster flowing to an adjoining cluster in accordance with exemplary embodiments.

Referring now of FIG. 5, an exemplary illustration 500 of these network pathways and the threat activity they enable as risk flow propagation from one asset cluster to another (i.e., the likelihood of risk in one cluster flowing to an adjoining cluster) is shown. An Asset group 502 is a collection of assets with similar profile and behavior. Edges or connections 504 in this asset group graph denote proximity and relationships in terms of shared users and data as well as traffic flow and access control. The determination of edge weights needs to consider the Asset Group Risk vector (Coverage 108, Importance 110, Threat-Score 112) for both groups. The design of the weight computation algorithm can be based on the following. The edge weight from Group 2 (source) to Group 4 (destination) along the edge 504 should be influenced by: (i) higher Coverage of either source or destination group reduces the risk of transmission and hence the weight; (ii) increased Importance 110 of the destination group would increase the weight considerably more than similar increase in source group Importance; (iii) threat-Score of the source group proportionately increase the edge weight; and (iv) unpatched exploitable CVE component of Threat-Score of the destination group proportionately increases the edge weight. Edge weights determine the flow of risk 506. For example, assume a large edge weight between Group 1 and Group 2. This implies that a compromised asset in Group 1 can scan for vulnerabilities and attempt to infected assets in Group 2 because the current Coverage (such a subnets and access controls) does not block it. However, communication between assets in Group 2 and Group 4 is restricted. This implies lower weight for the edge between Group 2 and Group 4. Hence, a lower risk propagation from Group 2 to Group 4.

The flow likelihoods over the graph 500 shown in FIG. 5 can be used to create measures of risk in the entire enterprise, and also used for creating simulation of risk flow triggered by events (e.g., patching of software, new coverage point deployment, insider breach, failure of protective measures). Such measures and simulations can be used to understand the overall security posture and it being influenced by events. This in turn can lead to better informed choices in security operations towards the goal of securing the enterprise. This method gives a framework to understand such effects by understanding the flow of risk to different parts of the organization (assets, data, and users) based on a trigger event. Such simulation of risk flow are used in the security process to help in prioritization of long-term efforts around the deployment of security tools and processes as well as estimating the potential impact of current security events. This in turn offers the advantage of providing better informed choices in security operations towards the goal of securing the enterprise.

The embodiments of present disclosure provide an improvement to enterprise systems by increasing cybersecurity effectiveness by offering the advantage of aggregating Assets into groups in defining group-level risk measures leading to two types of risk analysis. First, embodiments of the present disclosure can analyze the Asset risk profiles against one another within the same group. This enables an "apple to apples" comparison of the Assets. Second, embodiments of the present disclosure can analyze enterprise level risk from different vantage points on the basis of different groupings of Assets. As will be appreciated by those skilled in the art, the embodiments of the present disclosure provide a framework to understand such effects by understanding the flow of risk to different parts of the enterprise (Assets, Data, and Users) based on a trigger event.

According to fundamental embodiments of the present disclosure the analysis of flow propagation of elements of cybersecurity risk utilizes analysis of network pathways (e.g., to and from ingress or egress paths) and access to internal and external resources to create measures of flow (i.e., the likelihoods of risk in one cluster flowing to an adjoining cluster) These measures account for the access and proximity of the clusters (including the users of the assets) to each other. The access and proximity incorporate the observed traffic flow as well as knowledge about the network and access rights.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth herein.

What is claimed is:

1. A computer-implemented method for computing or modeling the risk of a cyber security breach to an asset, the computer-implemented method comprising executing on a processor the steps of:

gathering coverage information from network sensors, endpoint agents, and decoys related to the asset;

gathering importance information related to the asset, users, and data;

gathering alerts and anomalies from an enterprise;

gathering vulnerability information related to the asset;

computing a threat-score for the asset based on the gathered alerts and anomalies;

gathering connections or coupling information between the users and the assets, between the users and the data, and between the assets and the data, wherein the connections or coupling information between the users and the assets includes at least access or history of usage, the connections or coupling information between the users and the data includes at least data at rest and data in motion, the connections or coupling information between the assets and the data includes at least access rights and data observed in communication;

generating vectors for the assets, the users, and the data based on the gathered connections or coupling information, respectively;

fusing the generated vectors for the assets, the users, and the data to generate a 3-dimensional vector representation of coverage, importance, and threat-score of the assets, the users and the data; and computing an asset risk score based on the 3-dimensional vector to provide the asset risk score.

* * * * *